Jan. 16, 1940.　　　　F. M. KULKA　　　　2,187,161

MOLD SKIN DRIER

Filed Dec. 15, 1937

INVENTOR
FRANK M. KULKA
BY
Wheeler, Wheeler & Wheeler
ATTORNEYS

Patented Jan. 16, 1940

2,187,161

UNITED STATES PATENT OFFICE 2,187,161

MOLD SKIN DRIER

Frank M. Kulka, Milwaukee, Wis., assignor to Motor Castings Company, Milwaukee, Wis., a corporation of Wisconsin Application December 15, 1937, Serial No. 179,957

1 Claim. (Cl. 34—26)

My invention relates to improvements in mold skin driers.

The object of my invention is to provide a drier which dries a mold skin more thoroughly and perfectly and wherein the deeper and less accessible zones of the skin of the mold receive equally good skin drying compared with the drying action upon the broad upper surfaces of the mold. In more thoroughly and perfectly drying the skin of the mold, a comparatively small and inexpensive unit is employed, whereby to bake rather than to sear the mold skin.

Another object of my invention is to provide a mold skin drier which is virtually automatic in its operation and which requires no constant attention by an operator.

It is likewise an object of my invention to provide an arrangement of parts of my mold skin drier whereby the source of heat and the points of egress of the gases resulting from the drying operation permit of efficient heating and effective drying.

In the drawing.

Like parts are identified by the same reference characters throughout the several views.

Figure 1:
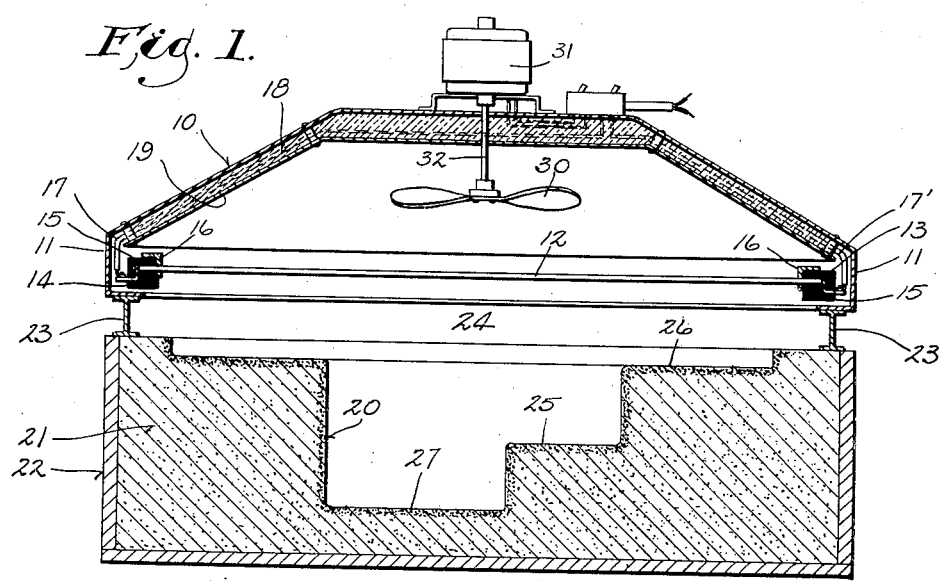
Figure 1 is a vertical section through the central part of my drier and of a mold with which my drier might be used, the motor being shown in elevation.
Figure 2:
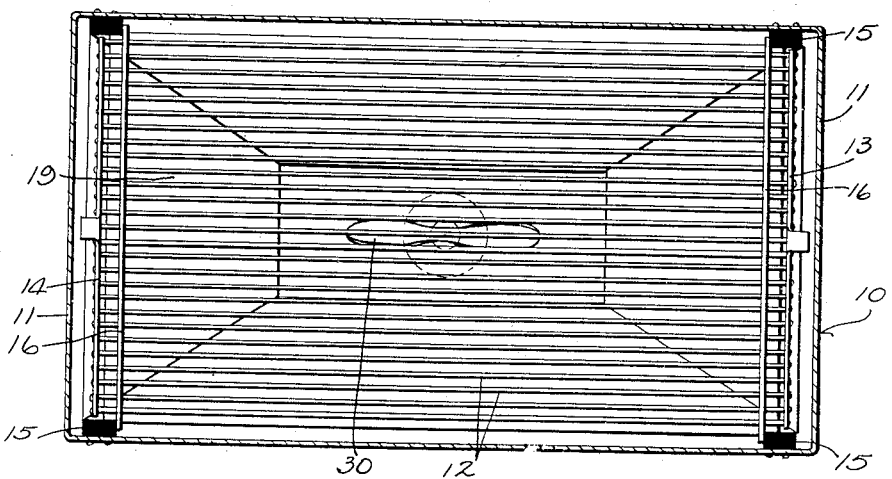
Figure 2 is a bottom view of my mold skin drier.

Generally speaking, the practice of forced drying of molds whereby the "skin" of the mold is dried is carried on by means of blow torches using such fuel as kerosene or gas. This practice calls for the exercise of great skill, since each surface, curve, or pocket in the mold requires careful selective treatment by the open flame and any excess heat applied to thin sections of projecting points may "burn" the skin and cause a defective casting to be made by the burned mold.

Mold skin drying is generally entrusted to the most experienced men in a foundry, and even with the most skilled handling the open flame, manually operated torch is, at its best, only a partial success and the alternative, namely the use of large ovens, is only slightly better and is only resorted to in practice where the molds are very small and are easily handled.

The open flame method of skin drying a mold is objectionable because it sears the surface, and it is my theory that the plumbago wash that is used upon a mold skin surface becomes excessively resistant to the passage of gases and vapors because of the searing action referred to.

My mold skin drier, combining a radiant and direct heat in a self-supported unit, provides for the relatively slow baking of the mold skin without any searing action, with a result that the dried mold skin, after the use of my drier, has an optimum perviousness, and I have found that mold skins dried under my drier are devoid of blisters, and castings coming from the molds dried by my drier are of very superior quality.

My mold skin drier comprises a very light and practical device since very little skill in its operation is required. The largest structural element in my mold skin drier is a hood 10 which is arched between its margins which are skirted as shown at 11. Within the hood and spanning the space between the skirted margins 11 is a source of heat which, as shown in the drawing, comprises a number of electrical resistance elements 12. I have found that a particular manufacture of these elements that is well suited to the purposes of my mold skin drier are resistance elements known as "calrods" or resistance coil in a cementitious envelope supported by an alloy steel shield or tube.

The resistance elements 12 are supported by bus bar electrical conductors 13 and 14 which are in turn supported by insulating blocks 15 of suitable material such as "fiber" secured to the skirt 15 of the hood. Spacing bars or angles 16, likewise supported by the fiber blocks 15, serve to give added support and maintain the proper spacing between the rods or resistance elements 12.

The bus bars 13 and 14 are connected electrically to a source of electric current, one of the bars being grounded as indicated at 17 and the other being "hot" as indicated by the electrical lead 17'.

Within the arch of the hood 10 I provide insulating material 18 which is inserted in a space between the hood and an interior reflective shell 19. This shell is formed preferably of a metallic substance which has a highly polished surface facing the source of heat, thus providing a "radiant" type heater which reflects heat from the surface of the shell 19 outwardly beyond the skirts of the hood 10.

My mold skin drier is used to heat treat and harden the skin 20 of a mold 21 in an ordinary mold box 22, and my drier is supported above the box and above the mold by any suitable supporting means 23 which will permit of ventilation through the space 24 above the top margins of the box 22. When my drier is electrically energized in position over a mold 21 the radiant heat reflected from the shell 19 is directed down upon the skin surfaces 20 of the mold and very soon after my drier is put to work a cloud of steam emerges through the ventilating openings 24, thus dissipating the moisture from the skin 20 whereby to carry on the drying operation.

I have found with a drier made according to the above description that the skin 20 of the mold is extremely evenly dried and that no "burning" results take place even though some of the surfaces as at 25 are farther from the shell 19 and from the resistance rods 12 than are some of the surfaces such as 26 in the mold. This is due to the comparatively moderate heat which is used in a drier such as that which I have shown in the drawing, and in part to the characteristics of the radiant type heater which tends to evenly distribute the heat despite the differences in distance between the source of heat 12 and the source of the reflected heat 19. My drier does not tend to burn even the surface 26 close to the resistance rods.

Obviously if a surface such as that shown at 27 is quite remote from the rods 12 and from the shell 19, the surfaces 25 or 26 may be more quickly dried because they do receive slightly more heat than does the surface 27. Under such circumstances I supplement my radiant drier action by the use of convection currents induced by a fan 30 operated by means of an electric motor 31 which is disposed outside of the hood 10. The shaft 32 of the motor extending through the hood and through the shell 19 supports and drives the fan. Where a large hood is used the fan 30 may also be used to dispel the vapor emanating from the surfaces of the mold. Such vapor acts as an obstruction to the passage of heat and an obstruction to the continued evaporation of moisture from the surfaces of the mold, and when the fan is operated rapidly there is a resulting expulsion of the vapors through the ventilating openings 24 around the skirt 15 of the hood.

Furthermore, the fan 30 will direct convection currents into the deeper portions of the mold to accomplish a more rapid drying action at that location.

The disposition of the motor 31 above the hood 10 and insulated from the heat of the rods 12, provides thermal protection for the motor even though the motor and shaft are directly disposed above the hottest portion of the shell 19.

In operation my hood is disposed above any mold 21 in any size or shape of box 22 merely by disposing the supporting elements 23 across the top of the box and then placing my mold skin drier upon the supports 23. The electrical circuit through my resistance elements 12 is then closed and the heat produced directly and radiantly by the resistances 12 and from the shell 19 is directed into the mold and against the surfaces 20 or 25—27. If a surface 27 is remote from the source of heat I may supplement the direct and radiant heat by means of convection currents induced by the fan 30, but generally speaking the even range of effectiveness over considerable distances down into a mold is carried on without the use of the fan 30. In fact, special conditions of rapid production of vapors and smoke from the mold may call for the use of the fan 30 more often than will remote surfaces to be heated and dried.

It will be seen from the above description that in a comparatively light weight heater mechanism I have provided for the baking rather than the searing of the skin of the mold. Actually, where the searing, blow torch method is used, a comparatively thin dried skin approximately one-eighth of an inch in thickness is produced, whereas, in the baking method which I pursue through the use of my heater or drier, the dried skin is approximately three-eighths of an inch thick, and the skin, under the use of my drier, is relatively more porous.

I claim:

In combination with a mold flask, a mold skin drying device including a hood having surfaces for reflection of heat, said hood being provided with a skirt portion, spaced heating elements extending across the hood and mounted in said skirt portion, means for removably supporting the hood above and in spaced relation to the flask to form a ventilating passage between the skirt portion and the flask to release vapor generated by the drying of the mold skin, and impeller means above the heating elements for propelling heated air into the deep portions of the mold to effect a rapid drying of the same and to insure a uniform heating of the mold skin surface.

FRANK M. KULKA.